Sept. 26, 1939.  L. F. WHITNEY  2,174,302
COMBINED REFRIGERATING AND WATER HEATING APPARATUS
Filed May 24, 1938   2 Sheets-Sheet 1

Sept. 26, 1939.   L. F. WHITNEY   2,174,302
COMBINED REFRIGERATING AND WATER HEATING APPARATUS
Filed May 24, 1938   2 Sheets-Sheet 2

Inventor
Lyman F. Whitney
by Probst, Cushman & Nordbury
att'ys.

Patented Sept. 26, 1939

2,174,302

UNITED STATES PATENT OFFICE 2,174,302

COMBINED REFRIGERATING AND WATER HEATING APPARATUS

Lyman F. Whitney, Cambridge, Mass., assignor, by mesne assignments, to Stator Corporation, a corporation of Rhode Island Application May 24, 1938, Serial No. 209,706

17 Claims. (Cl. 62—115)

This invention relates to a combined refrigerating and water heating apparatus, and more particularly to such apparatus including a heat-operated refrigerating system from which heat is transferred to a body of stored water. In some respects the present invention affords an improved system of the general type disclosed in my copending application Serial No. 192,343, filed February 24, 1938.

In general, this invention affords apparatus of this type wherein heat supplied to the refrigerating system by a heater may be directed to the body of stored water and whereby additional heat supplied by the heater may be transferred to the water substantially without necessitating increased refrigeration. Thus the heater may not only be effective in causing the circulation of refrigerant and consequent refrigeration and water heating, but may also be effective in heating water without increased refrigeration.

More specifically, the present invention affords an arrangement of the general type disclosed in my copending application Serial No. 168,957, filed October 14, 1937, wherein an auxiliary vaporizer is effective in receiving heat from the heater when the heat input rises to a relatively high point. In accordance with this invention, however, the heat received from the auxiliary vaporizer, rather than being dissipated to the surrounding atmosphere, is transferred to the body of stored water. For this purpose a separate heat dissipator may be employed, but I prefer to direct vapor from the auxiliary vaporizer to a portion of the refrigerant circuit which forms a heat dissipator and from which heat is ordinarily being transferred to the body of stored water.

This invention may be employed to particular advantage when the refrigerating system is of the aspirator type and is provided with a pipe containing a pressure-balancing column of propellant liquid. Such a system may be provided with a spill-over connection to limit the height of the pressure-balancing column and consequently to limit the maximum pressure in the vaporizer of the refrigerating system. When propellant passes through this spill-over connection, it is received by the auxiliary vaporizer. Vaporization of propellant in the auxiliary vaporizer absorbs a substantial fraction of the heat being supplied by the heater to the main vaporizer. The propellant vaporized in the auxiliary vaporizer preferably is introduced into the interstage cooler of the refrigerating system, the latter being provided with heat-receiving means such as a liquid-containing jacket that forms part of a heat transfer system for directing heat to the body of stored water.

As an example of when an arrangement of the present type may be employed to advantage the following is cited: Under certain circumstances more heat may be provided by the heater than is necessary or desirable in so far as the rate of refrigeration is concerned and/or the heat may be sufficient to cause an undesirable pressure in the boiler tending to denude the boiler by causing an increase in the pressure in the boiler to a point where the mercury in the return lines, in order to balance such pressure, would tend to fill chambers of large volume, such as the evaporator, and thus tend to denude the boiler of mercury. For example, such surplus heat supply may result from abnormal increase in gas pressure in the heat supply lines or may result from the particular way in which the heater control device has been adjusted, or may result from the use of an incorrect size of orifice in the gas burner.

Figure 1:
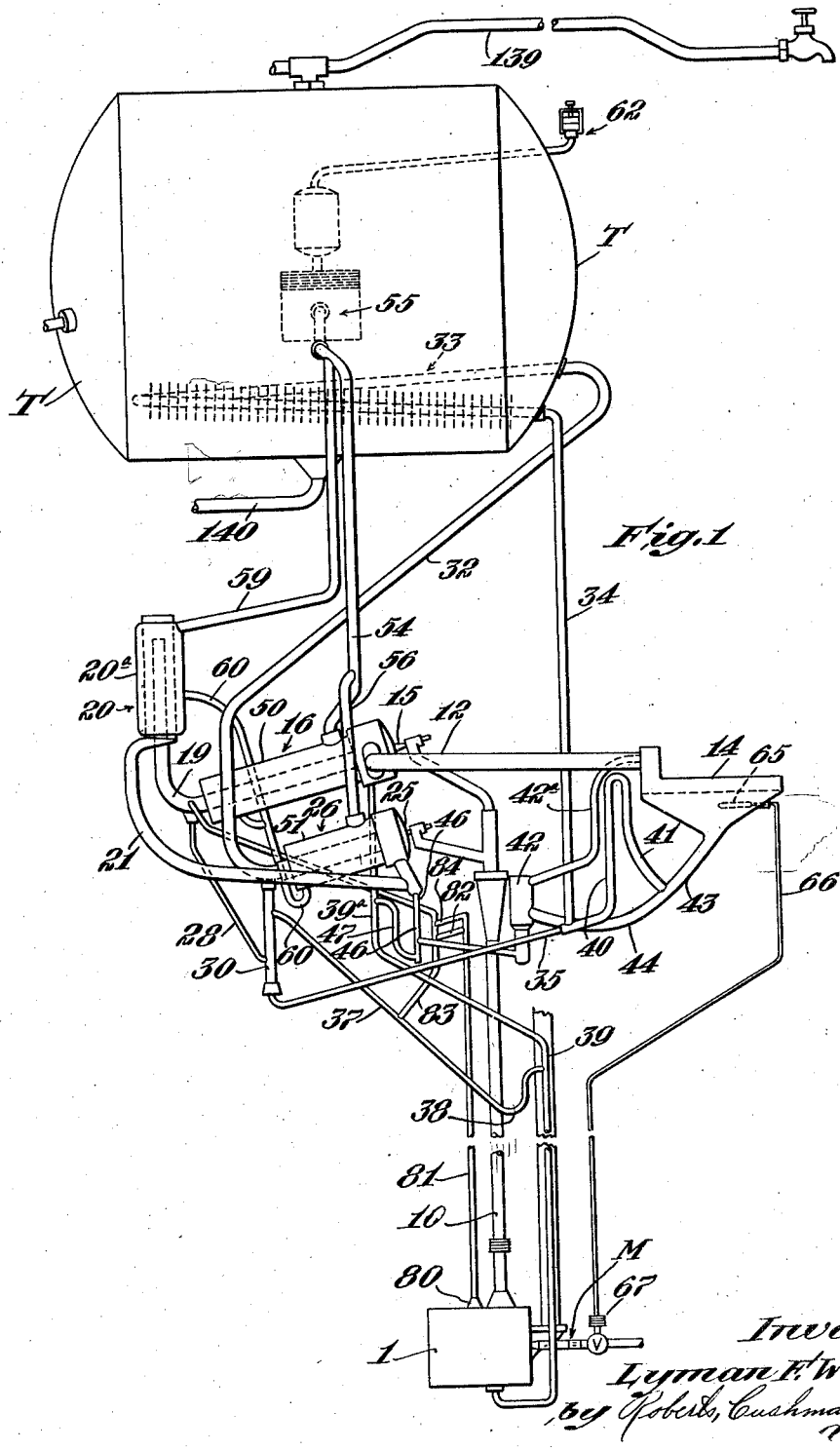
Fig. 1 is a diagrammatic elevational view of combined refrigerating and water heating apparatus constructed in accordance with this invention, parts being broken away.

The accompanying drawings show a refrigerating system of the general type more fully disclosed in my copending application Serial No. 171,325, filed October 27, 1937. Such a system is provided with a boiler 1, preferably containing mercury, which is heated by a suitable main burner M. The mercury vapor flows upwardly from the boiler 1 through the riser pipe 10 to the first and second stage aspirator nozzles 15 and 25 of the first and second stage aspirator assemblies 16 and 26, respectively. The first stage aspirator draws refrigerant vapor from the cooler 14 through the pipe 12, mercury being condensed in the first stage assembly 16 and the resulting condensate passing into the drain 28. Vapor from the first stage assembly passes through a vapor pipe 19 to an interstage cooler 20, which will be described in greater detail, and thence through a duct 21 to the mixing chamber of the second stage assembly 26. The mercury vapor from the second stage nozzle 25 is here effective in further compressing the refrigerant vapor. Condenser mercury from the second stage assembly is received by the drain 30 which also receives mercury from the drain 28. The compressed refrigerant passes upwardly through the vapor duct 32 to the refrigerant condenser 33, which may be provided with fins and which is located in the water tank T. Condensate from condenser 33 passes downwardly through a return pipe 34 which communicates at its lower end with an inclined pipe 35 forming one leg of a trap, the opposite leg of which is provided by the lower part of drain 30.

A pipe 37 is connected to the drain 30 and affords a spill-over connection tending to determine the level of mercury in the trap provided by pipes 30 and 35 as well as associated parts of the refrigerating system. The lower part of pipe 37 is connected through a trap 38 with a mercury return pipe 39, the pipes 37 and 39 containing a sufficient head of liquid mercury to balance the boiler pressure. The upper end of inclined pipe 35 is connected to an upstanding pipe section 40 which extends above the level of the liquid refrigerant in the cooler 14 to a connection with a downwardly extending pipe 41 that communicates with a duct or drain 43 extending downwardly from the bottom of the cooler 14.

The duct 43 preferably has a large diameter and forms a shallow trap 44 which is connected to a drum 42 that is connected by a pipe 42ᵃ with the head of cooler 14. The lower part of drum 42 has a connection with a drain 46 which receives condensed mercury from the mixing chamber of the second stage aspirator assembly. The lower end of this drain is connected by a pipe 47 with an upwardly extending continuation 39ᵃ of the return duct 39, this duct continuation 39ᵃ forming a drain to receive mercury from the first stage mixing chamber.

As fully explained in my above-identified copending application Serial No. 171,321, returning refrigerant passes through a mercury trap at the junction of ducts 34 and 40 and thence passes through the upper part of duct 40 and through ducts 41 and 43 back to the cooler. A system of this character, as more fully disclosed in my copending application Serial No. 136,612, filed April 13, 1937, may be evacuated and hermetically sealed so that vapor pressures in the cooler and condenser are substantially below atmospheric pressure. If desired, a system of this character may also be provided with a purger such as described in my copending application Serial No. 171,325.

The aspirator assemblies 16 and 26 may be provided with jackets 50 and 51 forming part of an auxiliary fluid circuit which may contain a suitable circulating medium such as alcohol. The jacket 50 is provided with an upwardly extending pipe 54 which communicates with an alcohol condenser 55 at the upper part of the system, while the jacket 51 is connected by a pipe 56 to the pipe 54. These pipes are arranged so that alcohol which is vaporized by the heat of mercury passing through the aspirator assemblies may rise into the condenser 55.

The interstage cooler 20 is provided with a jacket 20ᵃ (Fig. 2) which also forms a part of the auxiliary fluid circuit. The upper part of this jacket is connected by a duct 59 to the pipe 54 so that alcohol vapor can also rise from the interstage cooler 20 to the condenser 55. The duct 59 also forms a drain to receive condensate to return the same to the jacket 20ᵃ. The jacket 20ᵃ is connected by a pipe 60 to the lower part of jacket 51, the pipe 60 in turn being connected by a pipe 61 to the lower part of the first stage jacket 50.

Preferably the auxiliary fluid circuit is initially evacuated through a connection 62 so that the contained liquid, e. g. alcohol, may vaporize at a relatively low temperature (for example, around 176° F. when the temperature of water around dissipator 55 is 170° F. and around 120° F. when the temperature of the water is 100° F.) It is evident that the auxiliary fluid circuit just described affords means for conveniently transferring heat from the first and second stage aspirator assemblies and from the interstage cooler to the alcohol condenser 55 which is located in the hot water tank T. Preferably the refrigerant condenser 33 is located in the lower part of the tank T and the alcohol condenser 55 is disposed above the refrigerant condenser.

The tank T is provided with an inlet pipe 140 for receiving incoming water from the supply main. The upper and normally hottest part of the tank is provided with an outlet 139 for supplying water to the faucets of the house.

Preferably a temperature-responsive bulb 65 may be disposed in the region of the cooler 14 and may form a part of a thermostatic system including a tube 66 and expansible-contractible bellows 67. The latter is arranged to control a gas regulating valve $v$ in accordance with the temperature of the region of the cooler, so that the rate that gas is supplied to the main burner M may be varied in accordance with refrigeration demand.

The system so far described is of the same general type as that disclosed in my first above-identified application.

Figure 3:
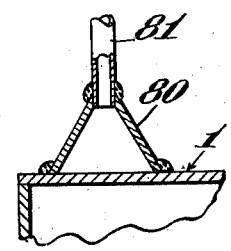
Fig. 3 is a sectional detail of the auxiliary vaporizer and related portions of the apparatus.

In accordance with this invention, an auxiliary boiler 80 may be mounted on the top of the main boiler 1. As shown in Fig. 3, the boiler 80 is in the form of a conical sheet metal chamber secured by welding to the top of the boiler 1. A duct 83 extends upwardly from the duct 37 between its connection to the duct 30 and the trap 38. The upper end of duct 83 communicates with the vapor pipe 19 between the aspirator assembly 16 and the interstage cooler 20. As shown, a vertically extending portion of the pipe 83 may have a spill-over connection through a short upwardly inclined duct 82, with a duct 81 extending upwardly from the auxiliary boiler 80. A second connection 84 between the ducts 83 and 81 may be arranged just above the connection 82 and substantially parallel thereto.

When the boiler pressure is quite high, the column of mercury in the lower part of the return pipe 39 will have branches extending upwardly into the upper part of this pipe, into the pipe 37 and into the pipe 83. When the branch column in pipe 83 rises to the connection of pipes 82 and 81, the mercury spills over and passes downwardly through the latter. Further increase in the height of the mercury columns is thereupon substantially precluded. When the mercury is thus received by the pipe 81, it passes into the auxiliary boiler 80 and is thereupon vaporized. Vaporization of the mercury in this auxiliary boiler absorbs heat from the vaporizer 1, thus substantially precluding a further increase in the rate of vapor flow through riser 10.

The vapor from the auxiliary boiler 80 rises through pipe 81 and through pipe 84, passing through the upper part of duct 83 and the vapor pipe 19 to the interstage cooler 20. Thus the mercury vaporized in the secondary boiler is received by the interstage cooler 20. It will be noted that pipe 81 preferably is non-capillary, so that liquid mercury can flow downwardly through the same while mercury vapor is rising through the same.

Figure 2:
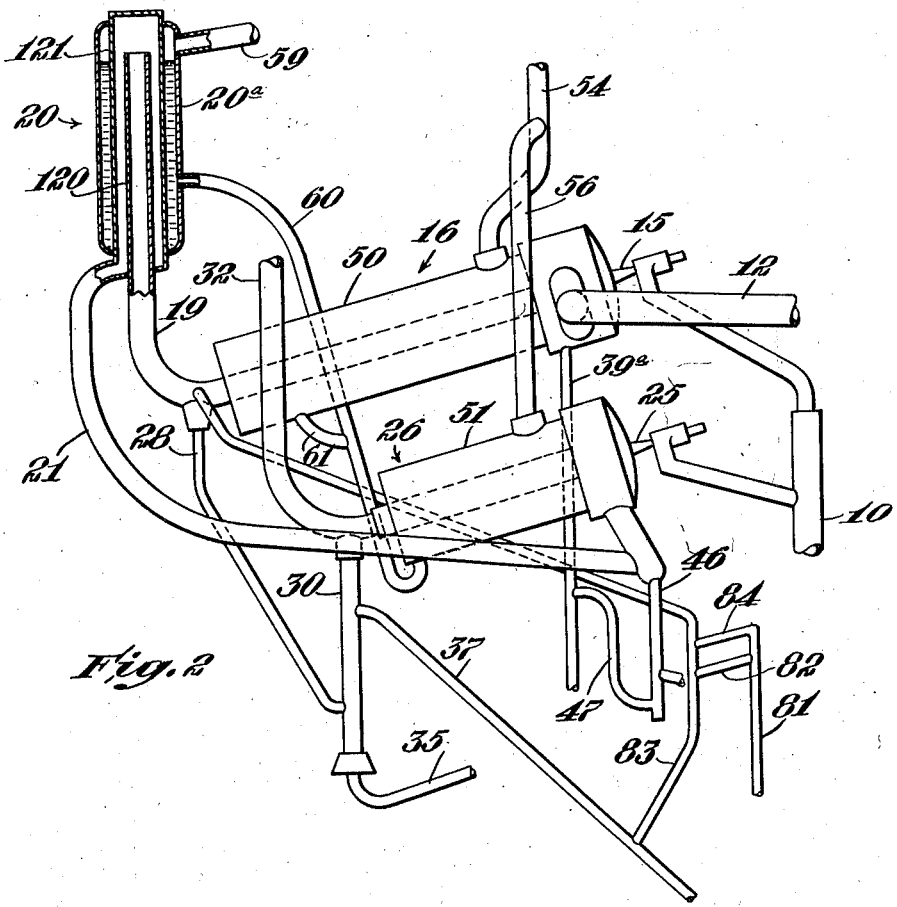
Fig. 2 is an elevational view of a portion of such apparatus, but on a larger scale and with parts shown in section.

Fig. 2 shows the arrangement of the interstage cooler 20 in greater detail. The incoming vapor from the first stage aspirator passes upwardly in duct 120 and through the open upper end of the latter into the chamber 121, the lower end of which is connected to the duct 21 which receives both vapor and condensed propellant from the chamber 121. The chamber 121 obviously is surrounded by the cooling jacket 20ª, as shown. This chamber provides a passage of substantial cross-sectional area to aid the settling and condensing of the mercury. It is evident that hot mercury vapor and mercury fog passing into the interstage cooler give up heat to the alcohol in the jacket 20ª and that the interstage cooler acts as a heat dissipator and as a condenser for this mercury, while also cooling the refrigerant vapor. The alcohol thus heated may vaporize and pass into the condenser 55, where it gives up its heat to the stored water. It is thus evident that the heat from the auxiliary boiler 80 is transferred to the water in the tank T.

The pipe 81 preferably is disposed close to the riser 10 so that this pipe is kept relatively warm to impede condensation.

It will be noted that the pressure in the secondary boiler 80 may be relatively low since the same is connected to the interstage cooler. Since pressure within the vaporizer 80 is substantially lower than the pressure within the main vaporizer 1, vaporization may occur in boiler 80 at a temperature substantially lower than that then necessary for vaporization in vaporizer 1. Thus, when mercury is received in boiler 80, heat can flow from vaporizer 1 to cause the mercury in boiler 80 to vaporize. A substantial fraction of the total heat received from the main burner M may then be effective in vaporizing the mercury in boiler 80. Accordingly, under such conditions, a further increase in the rate of heat supply does not tend to cause any substantial increased pressure in vaporizer 1 and resultant increased rate of vapor flow through the riser 10. Apparatus of this character therefore may be effective in supplying additional heat directly to the stored water without causing any substantial increase in the rate of refrigeration above a predetermined point. When the rate of heat supply is within a range below the point which results in operation of boiler 80, variations in the rate of heat supply may cause roughly proportional variations in the rate of refrigeration, while, when the rate of heat supply is above this point, a further increase in this rate may result in a much smaller increase in the rate of refrigeration than would have resulted from a similar increase in heat supply below said point.

Furthermore, within a range of heat supply to the vaporizer 1 extending both below and above the point where boiler 80 starts operating, the rate of heat supply to the body of water in tank T may be roughly proportional to the rate of supply to the vaporizer 1. Accordingly, throughout a range of heat supply below the point which results in operation of boiler 80, the ratio between the rate of refrigeration and the rate of water heating may be fairly uniform. When this point is passed, however, the rate of water heating increases much more rapidly than the rate of refrigeration.

It will be noted that the spill-over connection between pipes 82 and 81 prevents the propellant columns in pipes 39, 37 and 83 from rising undesirably high in the system.

It is of course evident that the burner M is controlled by the thermostatic means 65, 66, 67, and that under ordinary operating conditions the rate of heat supply preferably does not rise sufficiently to cause operation of secondary boiler 80.

It should be understood that the present disclosure is for the purpose of illustration only and that this invention includes all modifications and equivalents which fall within the scope of the appended claims.

I claim:

1. Apparatus comprising a refrigerating system of the heat-operated type and a water storage system, said refrigerating system including a vaporizer in which fluid is vaporized to cause operation of the refrigerating system, the latter also including a cooler and a heat dissipating portion from which heat is transferred to the water in said storage system, a secondary boiler associated with said vaporizer, and a duct to direct vapor from said boiler to the heat dissipating portion, whereby heat from the secondary boiler is also transferred to the stored water.

2. Apparatus comprising a refrigerating system of the heat-operated type and a water storage system, said refrigerating system including a vaporizer in which fluid is vaporized to cause refrigeration, the refrigerating system also including a cooler and a heat dissipator, said dissipator being arranged in heat-transfer relation to water in said storage system, a heater for said vaporizer, a secondary boiler also arranged to receive heat from the heater, a duct connecting said boiler to the dissipator so that heat from the boiler is also transferred to the stored water, and means for supplying liquid to said boiler when the pressure in the vaporizer rises above a predetermined point, whereby an increased rate of heat supply by the heater sufficient to cause rise in the vaporizer pressure above said point may be effective in causing increased heating of the water substantially without causing increased refrigeration.

3. Combined refrigerating and water heating apparatus comprising a refrigerating system including a heater, a refrigerating circuit through which refrigerant is circulated in response to operation of the heater, a heat dissipator in said circuit for directing heat to a body of water, and an additional circuit for transferring additional heat from said heater to the water substantially without necessitating increased refrigeration, said last-named circuit having a part in common with the refrigerant circuit, which part includes the heat dissipator.

4. Combined refrigerating and water heating apparatus comprising a refrigerating system including a heater, a refrigerating circuit through which refrigerant is circulated in response to operation of the heater, a heat dissipator in said circuit for directing heat to a body of water, and an additional circuit for transferring additional heat from said heater to the water substantially without necessitating increased refrigeration.

5. Apparatus of the class described comprising a water storage system and a refrigerating system, said refrigerating system including a refrigerant circuit, said refrigerant circuit including a condenser and a cooler, said refrigerating system also including a propellant circuit having a vaporizer and a part in common with the refrigerant circuit where refrigerant vapor is entrained and pumped from the cooler to the condenser, said part in common including a heat dissipator in heat-transfer relation to water in the storage system, a heater for said vaporizer, a secondary boiler also associated with said heater, and a duct for directing vapor from said secondary boiler to the dissipator, whereby heat may be received from the refrigerating system as a concomitant of refrigeration and whereby additional heat may also be received by the water from the secondary boiler substantially without necessitating additional refrigeration.

6. Apparatus comprising a water storage system and a refrigerating system, said refrigerating system comprising a refrigerant circuit including a cooler and a refrigerant condenser, said refrigerating system also comprising a propellant circuit including a vaporizer and a part in common with the propellant circuit where propellant vapor entrains and pumps refrigerant vapor from the cooler to the refrigerant condenser, said part in common including a heat dissipator in heat-transfer relation to water in the storage system, said propellant circuit also including a pipe wherein a column of liquid propellant balances the vaporizer pressure, a heater for said vaporizer, a secondary boiler also in heat-transfer relation to said heater, a duct extending upwardly from said secondary boiler, a spill-over connection between said pipe and said duct so that liquid propellant is supplied to the secondary boiler when the height of the column of propellant in said pipe reaches a predetermined point, said secondary boiler being arranged to supply propellant vapor to said dissipator whereby, when the supply of heat by the heater is increased, additional heat may be supplied to the stored water by the dissipator substantially without necessitating refrigeration at an increased rate.

7. Apparatus comprising a refrigerating system of the heat-operated type and a water storage system, said refrigerating system being arranged to direct heat to the stored water, said apparatus including a heater which operates to cause circulation of the refrigerant in the refrigerating system, thereby to provide refrigeration, and heat-transfer means operable upon the supply of additional heat by the heater to direct additional heat from the heater to the water substantially without necessitating increased circulation of the refrigerant and increased refrigeration.

8. Apparatus comprising a refrigerating system of the heat-operated type and a water storage system, said apparatus including a vaporizer in which fluid is vaporized to cause operation of the refrigerating system, the latter also including a cooler and a heat dissipator from which heat is transferred to water in said storage system, a secondary vaporizer associated with said first-named vaporizer, a second heat dissipator also in heat-transfer relation to water in the storage system, and a duct to direct vapor from said secondary vaporizer to the second heat dissipator, whereby heat from the secondary vaporizer is also transferred to the stored water.

9. Apparatus comprising a water storage system and a refrigerating system, said refrigerating system comprising two aspirator assemblies wherein propellant vapor is effective in entraining and compressing refrigerant vapor, an interstage cooler between said assemblies, said assemblies and said interstage cooler each being arranged in heat-transfer relation to water in said storage system, a vaporizer for causing the flow of propellant vapor to said aspirator assemblies, a secondary boiler in heat-transfer relation to said vaporizer, means to supply liquid to said secondary boiler in response to a predetermined high pressure within the vaporizer, a duct for directing vapor from said secondary boiler to the interstage cooler, whereby when the vaporizer pressure reaches a predetermined point, additional heat supplied by the heater may be directed to the body of stored water substantially without affecting the rate of refrigeration.

10. Apparatus comprising a refrigerating system of the heat-operated type, and a water storage system, said apparatus including a vaporizer in which fluid is vaporized to cause operation of the refrigerating system, the latter also including a cooler and a heat dissipator from which heat is transferred to water in said storage system, a secondary vaporizer in heat-transfer relation to the first-named vaporizer, a second heat dissipator in heat-transfer relation to water in the storage tank, means operable when the pressure in the first vaporizer exceeds a predetermined point to supply liquid to said secondary vaporizer, and a duct to direct vapor from said secondary vaporizer to the second heat dissipator.

11. Apparatus comprising a water storage system and a refrigerating system, said refrigerating system comprising two aspirator assemblies wherein propellant vapor is effective in entraining and compressing refrigerant vapor, an interstage cooler between said assemblies, a vaporizer for causing the flow of propellant to said aspirator assemblies, a secondary boiler in heat-transfer relation to said vaporizer, means to supply liquid to said secondary boiler in response to a predetermined high pressure within the vaporizer, a pipe for directing vapor from said secondary boiler to the interstage cooler, said interstage cooler including an upwardly extending duct through which the incoming vapor first passes, said duct having an upper end opening into a chamber disposed about the duct, and a pipe extending from the lower end of said chamber to receive condensate and vapor therefrom.

12. Apparatus of the class described comprising a refrigerating system including two aspirator assemblies, a vaporizer to supply propellant vapor to said aspirator assemblies, a refrigerant circuit including said aspirator assemblies, a condenser, a cooler and an interstage cooler between said assemblies, said interstage cooler including an upwardly extending duct to receive vapor from the first stage aspirator assembly, said duct having an open upper end, a chamber surrounding said duct, said chamber having an upper wall spaced above the open upper end of the duct, cooling means in heat transfer relation to said chamber, and an additional duct connected to the lower end of the chamber to receive condensate therefrom.

13. A refrigerating system comprising two aspirator assemblies, a vaporizer to supply propellant vapor to said assemblies, a refrigerating circuit including said assemblies, a condenser, a cooler, and an interstage cooler between the assemblies, said interstage cooler including an elongate duct for receiving vapor from the first stage aspirator assembly, said duct having an open end, a chamber surrounding said duct, said chamber having a wall spaced from the open end of the duct, a cooling jacket associated with said chamber, and a duct connected to the lower part of said chamber to receive condensate therefrom.

14. Apparatus comprising a water storage system and a refrigerating system of the heat-operated type, said apparatus including a vaporizer in which fluid is vaporized to cause operation of the refrigerating system, the latter also including a cooler and a heat dissipator from which heat is transferred to water in said storage system, a secondary boiler in heat-transfer relation to said vaporizer, a second heat dissipator in heat-transfer relation to water in the storage tank and arranged to receive hot vapor from said boiler, means operable when the pressure in said vaporizer exceeds a predetermined point to supply liquid to said boiler, the rate of refrigeration being roughly proportional to the rate of heat supply to said vaporizer when the vaporizer pressure is in a range below said predetermined point, a further increase in the rate of heat supply when the secondary boiler is operating resulting in a smaller increase in the rate of refrigeration than would result from a similar increase in heat supply when the vaporizer pressure was below said predetermined point.

15. Apparatus comprising a water storage system and a heat-operated refrigerating system including a vaporizer, said refrigerating system also including a heat dissipator for transferring heat to water in the storage system, said refrigerating system being arranged so that the rate of refrigeration increases roughly in proportion to the heat received by the vaporizer throughout a given range, and means effective in response to the supply of heat to the vaporizer at a higher rate to cause a corresponding increased rate of water heating without a substantial increase in the rate of refrigeration.

16. Apparatus comprising a water storage system and a heat-operated refrigerating system including a vaporizer, said refrigerating system also including a heat dissipator for transferring heat to water in the storage system, a single heater associated with said vaporizer, said refrigerating system being arranged so that the rate of refrigeration and rate of water heating are both roughly proportional to the heat supplied by said heater throughout a given range of heat supply, and means effective in response to the supply of additional heat by the heater to cause a corresponding increased rate of water heating with only a slightly increased rate of refrigeration.

17. Apparatus comprising a water storage system and heat-operated refrigerating system including a main vaporizer, and a heater operative to cause pressure in said vaporizer, said refrigerating system also including a heat dissipator for transferring heat to water in the storage system, the pressure in the main vaporizer below a predetermined pressure therein increasing as the heat supplied by the heater is increased, and means including an auxiliary vaporizer effective at said predetermined main vaporizer pressure to direct additional heat supplied by the heater to the body of stored water without substantially increasing the pressure in the main vaporizer.

LYMAN F. WHITNEY.